United States Patent
Jutla et al.

(10) Patent No.: US 10,735,182 B2
(45) Date of Patent: Aug. 4, 2020

(54) APPARATUS, SYSTEM, AND METHODS FOR A BLOCKCHAIN IDENTITY TRANSLATOR

(71) Applicant: Peer Ledger Inc., Halifax (CA)

(72) Inventors: Dawn N. Jutla, Halifax (CA); Peter Bodorik, Halifax (CA); Rohan V. Malcolm, Kingston (JM)

(73) Assignee: Peer Ledger Inc. (CA)

( * ) Notice: Subject to any disclaimer, the term of this patent is extended or adjusted under 35 U.S.C. 154(b) by 361 days.

(21) Appl. No.: 15/672,701

(22) Filed: Aug. 9, 2017

(65) Prior Publication Data

US 2018/0048461 A1 Feb. 15, 2018

Related U.S. Application Data

(60) Provisional application No. 62/373,337, filed on Aug. 10, 2016.

(51) Int. Cl.
| | |
|---|---|
| H04L 9/06 | (2006.01) |
| G06F 16/435 | (2019.01) |
| H04L 29/06 | (2006.01) |
| H04L 9/32 | (2006.01) |
| G06F 21/64 | (2013.01) |
| G06Q 20/38 | (2012.01) |

(Continued)

(52) U.S. Cl.
CPC .......... *H04L 9/0637* (2013.01); *G06F 16/435* (2019.01); *G06F 21/33* (2013.01); *G06F 21/64* (2013.01); *G06Q 20/02* (2013.01); *G06Q 20/382* (2013.01); *G06Q 20/3829* (2013.01); *H04L 9/3231* (2013.01); *H04L 9/3236* (2013.01); *H04L 9/3268* (2013.01); *H04L 63/0823* (2013.01); *H04L 63/0861* (2013.01); *G06Q 20/00* (2013.01); *G06Q 2220/00* (2013.01); *H04L 2209/38* (2013.01)

(58) Field of Classification Search
CPC . H04L 9/0637; H04L 2209/38; H04L 9/3236; H04L 9/3268; H04L 9/3231; H04L 63/0861; H04L 63/0823; G06F 21/64; G06F 16/435; G06F 21/33; G06Q 20/00; G06Q 20/382; G06Q 20/02; G06Q 20/3829; G06Q 2220/00
See application file for complete search history.

(56) References Cited

U.S. PATENT DOCUMENTS

| | | |
|---|---|---|
| 9,436,923 B1 | 9/2016 | Sriram et al. |
| 9,667,427 B2 | 5/2017 | Oberhauser et al. |

(Continued)

*Primary Examiner* — Matthew Smithers
*Assistant Examiner* — Mirza Israr Javed
(74) *Attorney, Agent, or Firm* — Tarolli, Sundheim, Covell & Tummino LLP

(57) ABSTRACT

Blockchain applications can generate public/private key pairs without knowing the true identity of the owner of the private key. Many applications, such as in healthcare or corporate banking, require known identities for legal or regulatory reasons. Therefore a mapping between PKI certificate credentials maintained by certificate authorities and blockchain credentials is needed as one means of transferring real-world identity to blockchain applications. A method and system are provided to associate a PKI certificate to one or more accounts in a cryptographic wallet and extend the due diligence of a third-party certificate authority for identity management on blockchains.

17 Claims, 16 Drawing Sheets

(51) Int. Cl.
  *G06Q 20/02* (2012.01)
  *G06F 21/33* (2013.01)
  *G06Q 20/00* (2012.01)

(56) References Cited

U.S. PATENT DOCUMENTS

| | | |
|---|---|---|
| 2006/0036442 A1 | 2/2006 | Novack et al. |
| 2013/0073436 A1* | 3/2013 | Luk ................ G06Q 10/06 705/30 |
| 2015/0081567 A1* | 3/2015 | Boyle ............... G06Q 20/02 705/71 |
| 2015/0244690 A1 | 8/2015 | Mossbarger |
| 2015/0356555 A1 | 12/2015 | Pennanen |
| 2016/0342994 A1* | 11/2016 | Davis ............... G06Q 40/02 |
| 2017/0149560 A1* | 5/2017 | Shah ................ G06K 7/1417 |
| 2017/0180128 A1 | 6/2017 | Lu |
| 2018/0048461 A1* | 2/2018 | Jutla ................ H04L 9/3236 |

* cited by examiner

APPARATUS, SYSTEM, AND METHODS FOR A BLOCKCHAIN IDENTITY TRANSLATOR

CROSS REFERENCE

The present application claims all benefit, including priority, of U.S. Provisional Patent Application Ser. No. 62/373,337, filed Aug. 10, 2016, entitled SYSTEM AND METHODS FOR A PKI-BLOCKCHAIN IDENTITY TRANSLATION SERVICE, the contents of which are hereby incorporated by reference.

BACKGROUND

Currently, users may apply for a digital certificate from a certificate authority and may present government-issued credentials, among other forms of identification to the certificate authority for user verification. The certificate authority will issue a digital certificate to the user when verified. The digital certificate will be signed with the CA's private key. External CAs register their public key with major browser-makers such as Apple (Safari), Google (Chrome), Netscape (Firefox), and Microsoft (Internet Explorer). When a user presents her certificate to a browser-accessed application, the browser may use the CA's public key to check whether the user's certificate is valid.

Digital certificates are used in blockchain identity systems such as Netki, which issues digital certificates for the blockchain and uses blockchain Payment Protocol (BIP70/75).

Blockchains are useful for immutably recording digital assets for users. However, user identities may or may not have been verified.

SUMMARY

However, Netki's and other blockchain companies' new digital certificates in the state of the art are not associated with verified real—world identities via existing PKI certificates issued by a third party certificate authority. Thus, Netki's digital certificates are redundant in high-assurance industries using existing PKI infrastructure, including certificate authorities and mature PKI standards.

Blockchains are not adapted for use or to manage previously issued and mapped PKI certificates to enhance its identity mechanisms. As yet the blockchain has not been adapted to leverage existing external public key infrastructure (PKI), including external third-party certificate authorities, to strengthen identity on the blockchain.

The present disclosure provides systems and methods for leveraging the advantages of existing PKI identity infrastructure to provide identity data on blockchains. This can help with identity fraud on blockchains.

This disclosure provides systems and methods for associating an external certificate authority's issued certificates, such as X509 digital certificates, with cryptographic wallets and the accounts in them, thereby mapping and transferring the Certificate Authorities' (CA) credentials to blockchain users.

The disclosure involves a user first obtaining a digital certificate (e.g. an X.509 certificate) from the certificate authority (CA) and then registering the certificate, and zero or more biometrics, with a blockchain identity translation (BIT) service. Note that it is assumed that a CA's public key is registered with a blockchain identity translation (BIT) service beforehand or that the BIT service obtains the certificate from the user or the CA.

On registration, the bit service will use the CA's public key to assure that the user's digital certificate is authentic. Further, the bit service will challenge the user to encrypt a random plaintext, which it will decrypt with the user's public key. If the bit service successfully decrypts the challenge text, any user biometrics associated with the digital certificate will be tested next. If the user also passes the additional authentication tests, the bit service will create a binding or mapping between the user's wallet with one or more of its accounts, and the user's digital certificate; in one embodiment, the mapping is placed as a certificate path in the user's wallet.

In another example embodiment, the mapping is placed in storage auxiliary to the blockchain; in another example embodiment a reference to a PKI certificate may be deposited in the user's wallet via an immutable blockchain transaction. To access a blockchain application, in one example embodiment, the user securely provides her cryptographic wallet's address and requests a token from the bit service. The service scans the user's wallet for the user's digital certificate or its certificate path. If the certificate or its path is present in the wallet, the bit service issues a time-limited token to the identified user to interact with the blockchain application. Users may anonymously conduct transactions on the blockchain, but may be re-identified to approved parties via the bit service mapping, if or when needed.

In one embodiment, blockchain wallets are adapted to store and manage digital certificates. In another embodiment, certificates are stored in off-blockchain storage and mapped to blockchain addresses.

FIGURE NUMBERS

Figure 1:
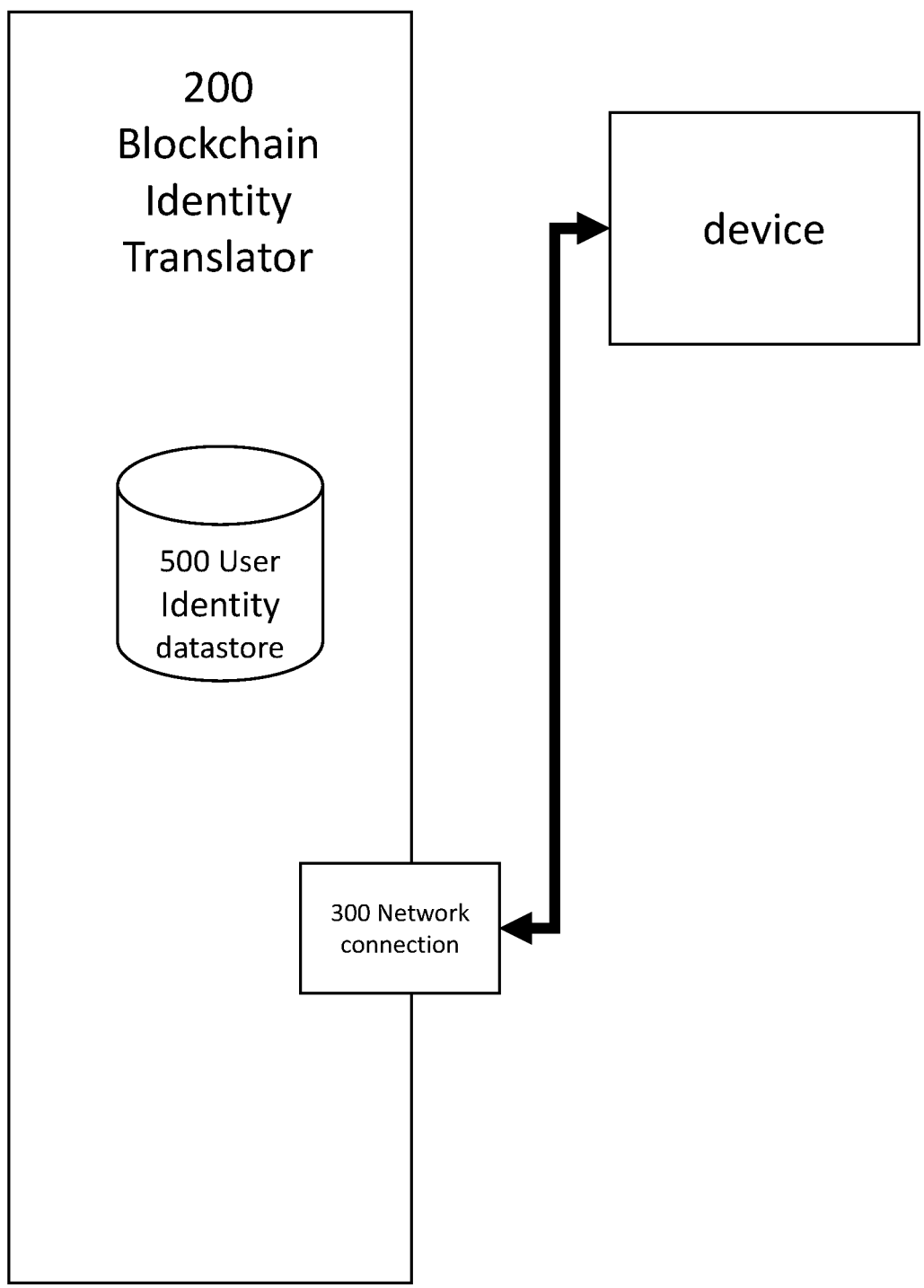
FIG. 1 is a schematic diagram depicting an example blockchain identity translator.

100 User
110 Blockchain Identity Translator Administrator
150 Request Message
160 Challenge Message
161 Response Message
171 Request to Biometric Identity Service Provider
172 Response from Biometric Identity Service Provider
181 Storing User Identity Information
183 Storing Certificate Path on Blockchain
199 Message to User
200 Blockchain Identity Translator
210 User Registration Service
212 BIT DApp Registration Service
217 BIT Wallet Browser
220 Certificate Authority
230 Biometric Identity Service Provider
300 Network Connection
350 User Wallet
390 Blockchain
400 Distributed Application
401 DApp Registration request
402 Request for credentials and default user identification and authentication methods
403 message/reply
404 request to DApp Storage to record/store
405 request to the BIT Wallet Browser
410 Successful Registration Message
450 Distributed Application Storage
500 User Identity Datastore
601 user request to the BIT App Registration 212
605 Message from Administrator to DApp Registration Service
606 Message from DApp Registration Service to User Registration Service
610 Request from User Registration Service to Blockchain
615 Reply from Blockchain to User Registration Service
618 Request from User Registration Service to Blockchain to store Certificate Path
619 Reply from Blockchain to User Registration Service
620 Request from User Registration Service to BIT Identity Storage
620 Message to User
621 Response Message from BIT Identity Storage
622 Request from User Registration Service to BIT Identity Storage
623 Response from User Registration Service to DApp Registration Service
625 Response from DApp Registration Service to Administrator
700 Blockchain Identity Translator Administrator 700
701 Request from BIT Administrator to BIT App Registration 212
710 Reply to BIT Administrator 700
801 Request to BIT Wallet Browser
802 Request to DApp Storage
803 Response with indication of whether DAPP is registered with BIT Services
804 Request from DApp Registration Service 212 to User Registration Service 210
805 Response from to the DApp Registration Service 212
811 Request to BIT Identity Storage
812 Response from BIT Identity Storage
828 Request to CA
829 Response from CA.
851 Request to BI service
852 Response from BI service
860 Response from BIT Wallet Browser to DApp
1100 request to Administrator
1150 Message from Administrator to BIT Registration Service
1171 Request from BIT Registration Service to BI Service
1172 Reply from BI service to BIT Registration Service
1181 Message to User Identity Storage
1183 Message to User Wallet to Store Certificate Path
1198 Response Message
1199 Message from Administrator to User

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Referring now to FIG. 1, a schematic diagram depicting an example blockchain identity translator 200 is provided. The blockchain identity translator 200 is capable of verifying the electronic identity information of a user from the user's anonymous blockchain account information. When requested, the blockchain identity translator 200 determines, based on the blockchain account information provided, the identity of the user associated with the blockchain account information.

The blockchain identity translator 200 can be used in a variety of scenarios. For instance, the blockchain identity translator 200 can be used in blind studies. In these studies, participants can use their anonymous blockchain information to login, sign and otherwise perform actions in the study. This allows the information entered into the study to remain anonymous. Once the study has completed, the identities of the participants can be determined and/or verified by using the blockchain identity translator 200. The results of the study and its participants can then be verified.

Alternate uses for the blockchain identity translator 200 can be contemplated without departing from the scope of this disclosure. For example, law enforcement may use the blockchain identity translator 200 to identify transactions signed with an anonymous blockchain account, assuming that the user has registered with (or is compelled to register with) a blockchain identity translator 200.

Referring again to FIG. 1, in some embodiments the blockchain identity translator 200 may return information regarding the identity of the user to the requestor. This can include, but is not limited to, the user's identification information, the user's biometric information, or an indicator indicating that the user is the person he/she claims to be.

In other embodiments, the blockchain identity translator 200 may provide log-in services for Distributed Applications (DApps).

In the embodiment depicted in FIG. 1, the blockchain identity translator 200 includes a user identity datastore 500. The user identity datastore is configured to store user data. This user data can include, but is not limited to, a user's electronic identity data and anonymous blockchain account information.

In some embodiments the user's electronic identity data is verified. For example, in some embodiments the user's electronic identity data is obtained from a digital certificate that was issued by a certificate authority that had previously verified the identity of the user. In this embodiment, the certificate authority only issue certificates to users who have undergone an identity verification process.

Figure 2:
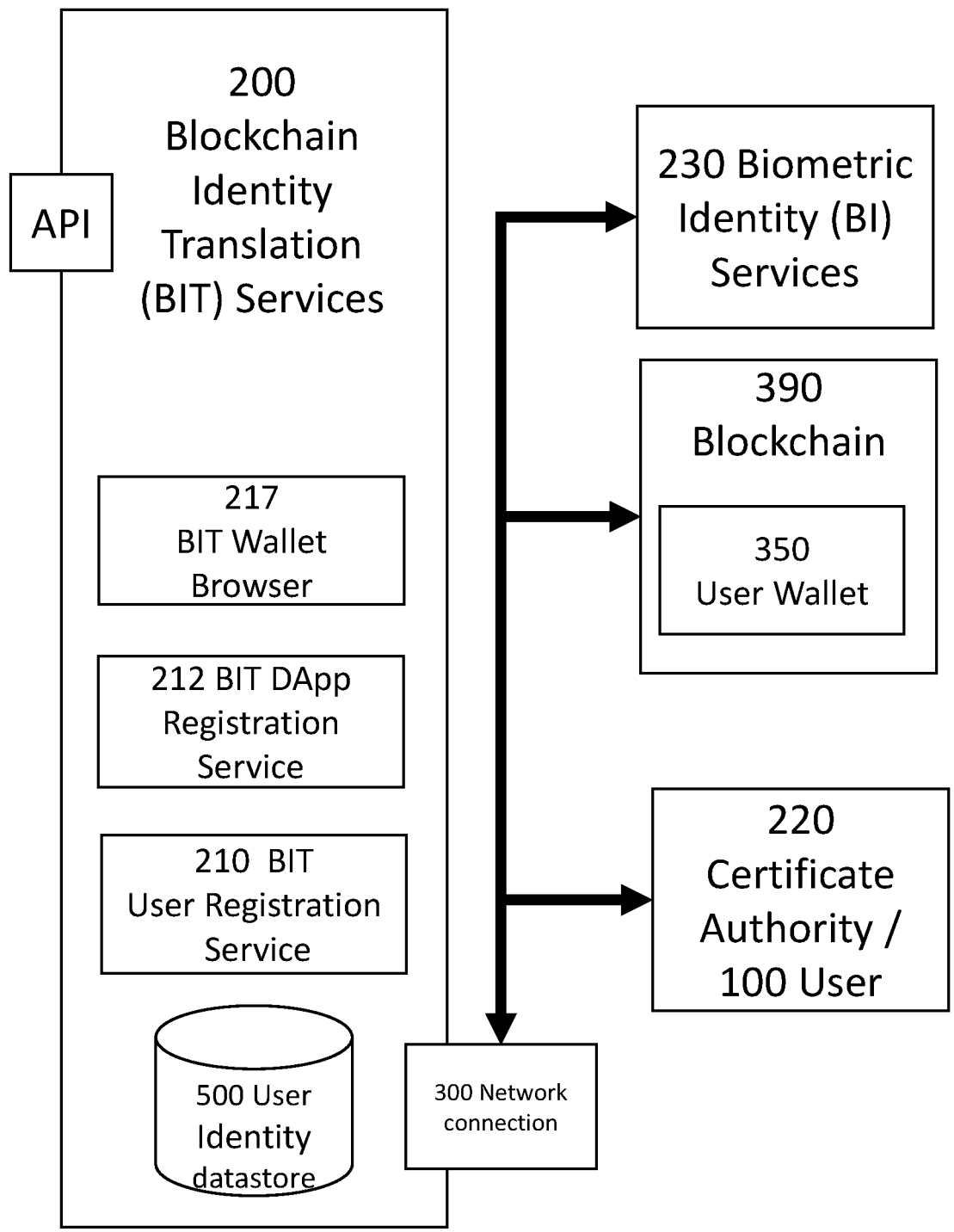
FIG. 2 is a schematic diagram depicting an alternate example blockchain identity translator.

Referring to FIG. 1 and FIG. 2, in some embodiments the user identity datastore 500 is a database configured in the blockchain identity translator 200. FIG. 2 is a schematic diagram depicting an alternate example blockchain identity translator. In this embodiment the blockchain identity translator 200 includes a data storage device such as a hard drive, solid state drive, etc., that is configured to store, at least in part, the user identity datastore 500. In the embodiment depicted in FIG. 2, the user identity datastore 500 is a relational database management system stored on the data storage device.

Other datastores may be used without departing from the scope of this disclosure. For instance, non-relational database managers, NoSQL datastores, document stores, etc. may be used. Examples of such database managers include, but are not limited, to MongoDB, Firebase, etc.

Referring now to FIG. 2, in this embodiment the BIT 200 includes a BIT Wallet Browser 217. The BIT Wallet Browser 217 is configured to allow secure access to the user's Blockchain User Wallet by the user, by DApps (to identify or authenticate, at least in part its users), and/or by the BIT Administrator.

This embodiment further includes a BIT DApp Registration service 212. The BIT DApp Registration Service is configured to allow DApps to register with the BIT Services 200. A DApp is a collection of smart contracts and related web services that provide a business application's functionalities.

In this embodiment the Blockchain 390 is associated with a user wallet 350. The User Wallet 350 (or BIT Wallet) is configured to store, at least in part, information regarding transactions in the blockchain 390 associated with the user. This information can include, but is not limited to, blockchain transaction information, blockchain addresses (e.g., BITCOIN addresses), private keys, etc. Examples of User Wallets include, but are not limited to, BLOCKCHAIN WALLET (for BITCOIN), ELECTRUM (for BITCOIN), EXODUS (for different cryptocurrencies), etc.

Figure 3:
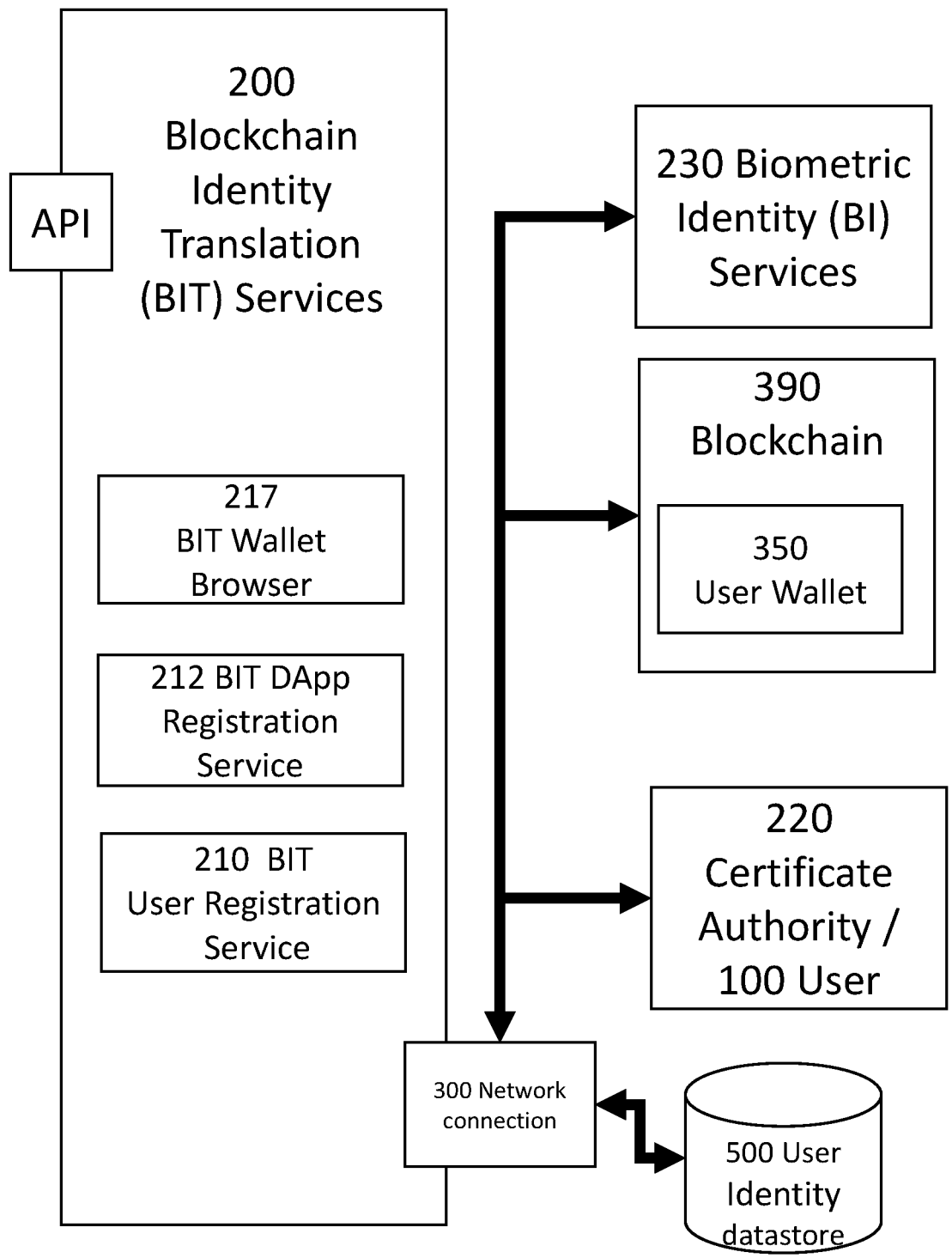
FIG. 3 is a schematic diagram depicting an alternate example blockchain identity translator.
Figure 4:
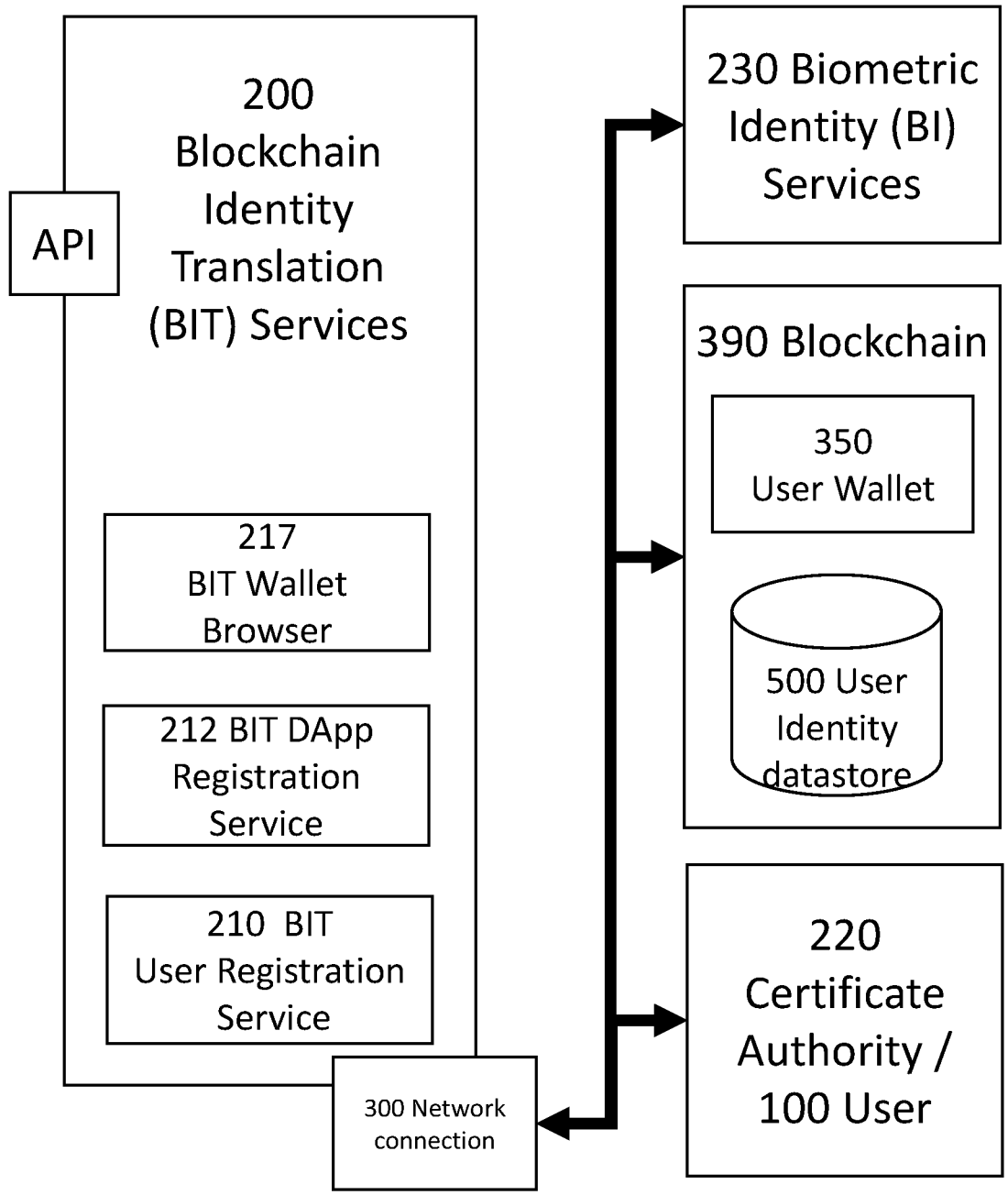
FIG. 4 is a schematic diagram depicting an alternate example blockchain identity translator.
Figure 5:
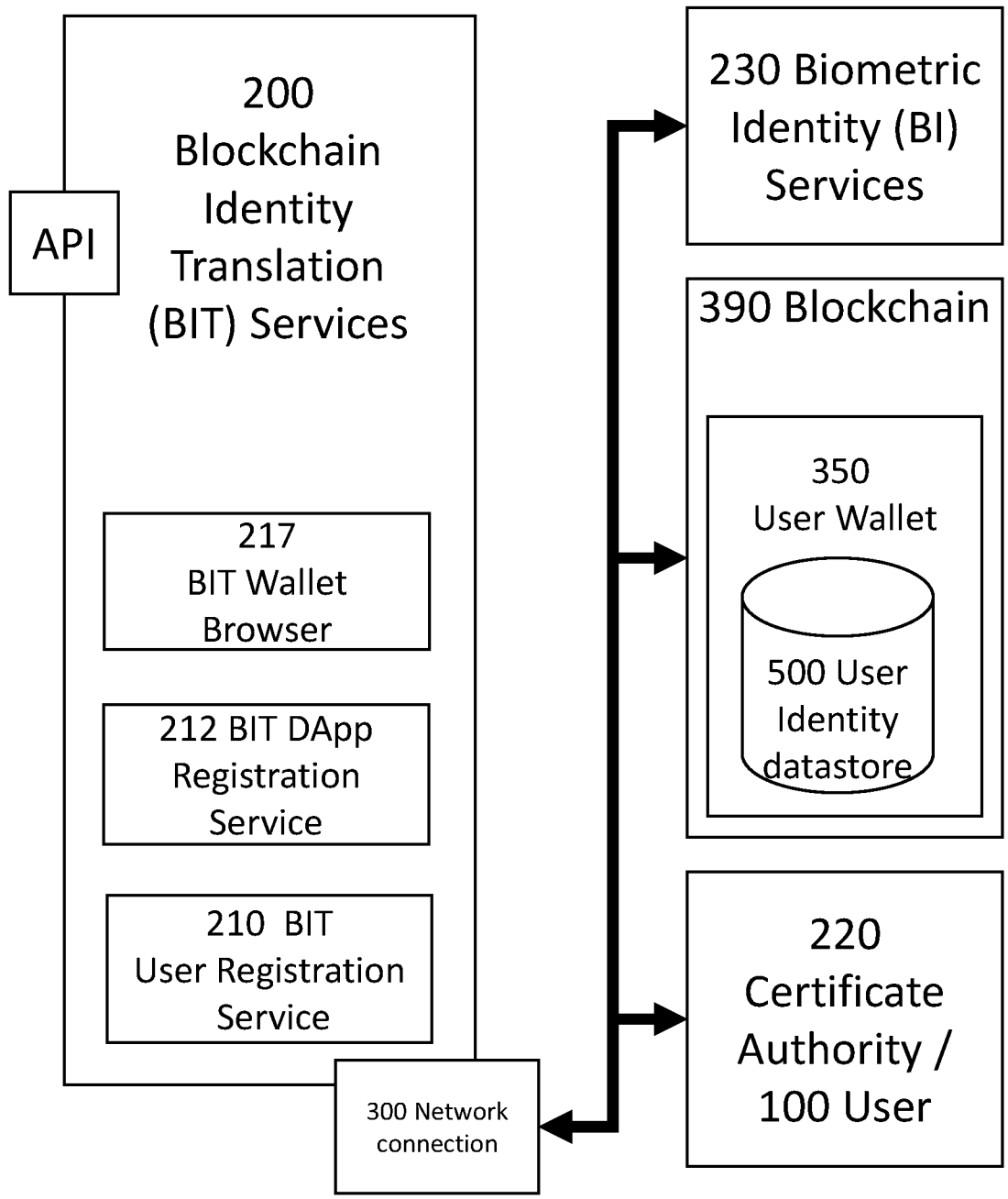
FIG. 5 is a schematic diagram depicting an alternate example blockchain identity translator.

As depicted in FIG. 3 and FIG. 4, in some embodiments the user identity datastore 500 may be remotely located from the blockchain identity translator 200. In the examples depicted in FIG. 3 and FIG. 4 the user identity datastore 500 is deployed remotely. For example, the user identity datastore 500 may be configured in a remote MySQL, MongoDB, Firebase, or other remote datastores and/or across multiple cloud storage servers. The blockchain identity translator 200 and the user identity datastore 500 are connected via the network connection 300.

Referring again to FIG. 4, in this example the user identity datastore is in the blockchain itself. In this embodiment information related to the user identity may be stored, in an encrypted format, on the blockchain itself. This can be used with blockchain providers (e.g., cryptocurrencies) that allow for information storage (e.g., contracts, arbitrary data, etc.) on the blockchain. Examples of such blockchain providers include, but are not limited to, ETHEREUM.

In the example depicted in FIG. 1 to FIG. 5, the blockchain identity translator 200 includes a network connection 300. The network connection is configured to allow the blockchain identity translator 200 to communicate with devices over a network.

In some examples, the network connection includes a network interface card for communicating with a network. For instance, in some examples the network interface will include a wired or wireless network interface for connecting to the Internet, Virtual Private Network (VPN), Local Area Network (LAN), Wide Area Network (WAN), or other network. In another example the network connection may be a virtual network interface on a virtual machine host for connecting to the Internet, VPN, LAN, WAN, or other network.

Referring again to FIG. 1 and FIG. 5, the blockchain identity translator is configured to process a request from the device on the network, determine the verified electronic identity information of the user from the anonymous blockchain account information of the user, and provide a response to the device on the network. The response is based on the associated verified electronic identity information of the user and the anonymous blockchain account information of the user.

The blockchain identity translator is configured to run on a processor. In an embodiment, the blockchain identity translator is configured to operate on a server having a one or more general purpose (or application specific integrated circuit) processors that can access a memory and execute machine readable instructions, non-transitory machine readable memory having machine executable instructions, mass storage (hard drive/solid state drive) for storing, at least in part, machine executable instructions, and a network connection 300.

In some examples the blockchain identity translator may be configured to operate in a cloud computing environment. In this embodiment the processor, memory, mass storage, and network connection may be implemented in a virtual machine environment where these resources are shared by several other applications. For instance, in some embodiments the blockchain identity translator may be configured to run in a an AMAZON EC2, MICROSOFT AZURE, GOOGLE CLOUD COMPUTE ENGINE, or any other virtual cloud computing instance.

In some embodiments the blockchain identity translator is a part of a system that includes other devices on the network. For instance, in an embodiment the blockchain identity translator is configured to operate with Certificate Authorities, Remote Storage (e.g., Interplanetary File System, remotely configured databases/datastores), Distributed Applications, Biometric Identity Service Providers, and/or a Blockchain Account Provider.

In yet another embodiment, the blockchain identity translator is computer implemented code and/or method that is configured to be run on a processor.

As depicted in FIG. 2-FIG. 5, the blockchain identity translator 200 may also include an application programming interface (API). This API allows third-party applications to use the services offered by the blockchain identity translator 200 via the API. For example, third-party distributed applications (DApps) may communicate with the Blockchain Identity Translator 200 using the API.

Referring now to FIG. 2-FIG. 5, the blockchain identity translator includes a user registration service 210 configured to register a user and associate the user account information with a blockchain account information. In some embodiments the user registration service 210 is configured to obtain electronic identity information from one or more identity providers or services.

For example, FIG. 2 to FIG. 5 depict a user registration service 210 configured to obtain the verified electronic identity information of the user through a network request to a remote certificate authority 220 on the network. In another example, the registration service 210 is configured to obtain the verified electronic identity information through a network communication directly with the user 100. This network communication to the user can include, but is not limited to, email, instant messaging, sending a message to a user client, etc.

The user's electronic identity information that was obtained from the remote certificate authority 220 (or the user 100) is stored in the user identity datastore 500.

In this example the user registration service 210 communicates with the certificate authority 220, or its provider, on the user's behalf. The user registration service 210 requests a public key infrastructure (PKI) certificate associated with the user. It will be appreciated that the user must, at some point, have been issued a PKI certificate using the certificate authority's 220 infrastructure.

Note that, as is generally accepted practice, the certificate is digitally signed with the certificate authority's private key. Consequently, to confirm that the certificate is valid, that it has not been tampered with, and was issued by a valid certificate authority 220, the certificate authority's published public key is used to verify the certificate authority certificates' digital signature.

Once the user registration service 210 has obtained the user's public certificate from the certificate authority 220 (or the user 100) and the certificate has been verified to be valid, the blockchain identity translator 200 stores the user's certificate information in the user identity datastore 500.

Referring again to FIG. 2 to FIG. 5, in this example embodiment the user registration service 210 is configured to obtain a biometric identity information of the user through a network request to a biometric identity service provider 230 on the network. The biometric identity information of the user is then associated with the verified electronic identity information of the user. This information is stored in the user identity datastore 500.

The biometric identity service provider 230 stores, among other things, biometric data associated with the user. This can include, but is not limited to, user data such as fingerprint, retina, palmprint, and facial data.

In this example the user registration service 210 is configured to communicate, on the user's behalf, with the biometric identity service provider 230 via the network. For example, the biometric identity service provider 230 may include an application programming interface (API) through which the user registration service 210 can communicate.

Once the user registration service 210 has obtained the user's biometric information from the biometric identity service provider, the blockchain identity translator 200 stores the user's biometric information in the user identity datastore 500.

Referring again to FIG. 2 to FIG. 5, the user registration service 210 is also configured to obtain the anonymous blockchain account information of the user through a network request to a remote blockchain account provider (that is configured to access the blockchain 390) on the network. The anonymous blockchain account information is stored in the user identity datastore 500.

The blockchain account provider (that is configured to access the blockchain 390) stores, among other things, the anonymous blockchain user identifier controlled by the user. Generally, a blockchain account information consists of two parts, one identifies the blockchain itself, for instance it could be one of a Hyperledger permissioned blockchain types along with its unique identifier, or it could be a private Ethereum blockchain identifier, or it could be the Bitcoin or other blockchain. The other part of account information identifies the user by the user's public key in a user certificate (as Implemented in Hyperledger) or by an address on the blockchain identified by the first part (as implemented in Ethereum). The blockchain account address is often a subset of a public key that has been associated with an unverified or verified user.

In this example the user registration service 210 is configured to communicate, on the user's behalf, with the blockchain account provider (that is configured to access the blockchain 390) via the network. For example, the blockchain account provider (that is configured to access the blockchain 390) may include an API through which the user registration service 210 can communicate. In some embodiments this information may be stored on the blockchain itself. In other embodiments, the blockchain account information may be stored in a user wallet 350 hosted by a remote blockchain account provider (that is configured to access the blockchain 390). In yet another embodiment, the user wallet 350 may be stored on a local or offline computer. In this example the user registration service 210 can extract the user's blockchain account information from the user wallet 350. It is appreciated that the user wallet may be implemented as in the state-of-the-art as a hardware device and/or software systems.

Once the user registration service 210 has obtained the user's blockchain account information from the blockchain account provider (that is configured to access the blockchain 390) and/or user wallet 350, the blockchain identity translator 200 stores the user's blockchain account information in the user identity datastore 500.

It will be appreciated that once a user's electronic identity information is associated with the user's anonymous blockchain account information, the anonymous blockchain account information will no longer be completely anonymous. That is, the blockchain identity translator 200 will be able to determine the identity of the user associated with the anonymous blockchain account information.

Figure 6A:
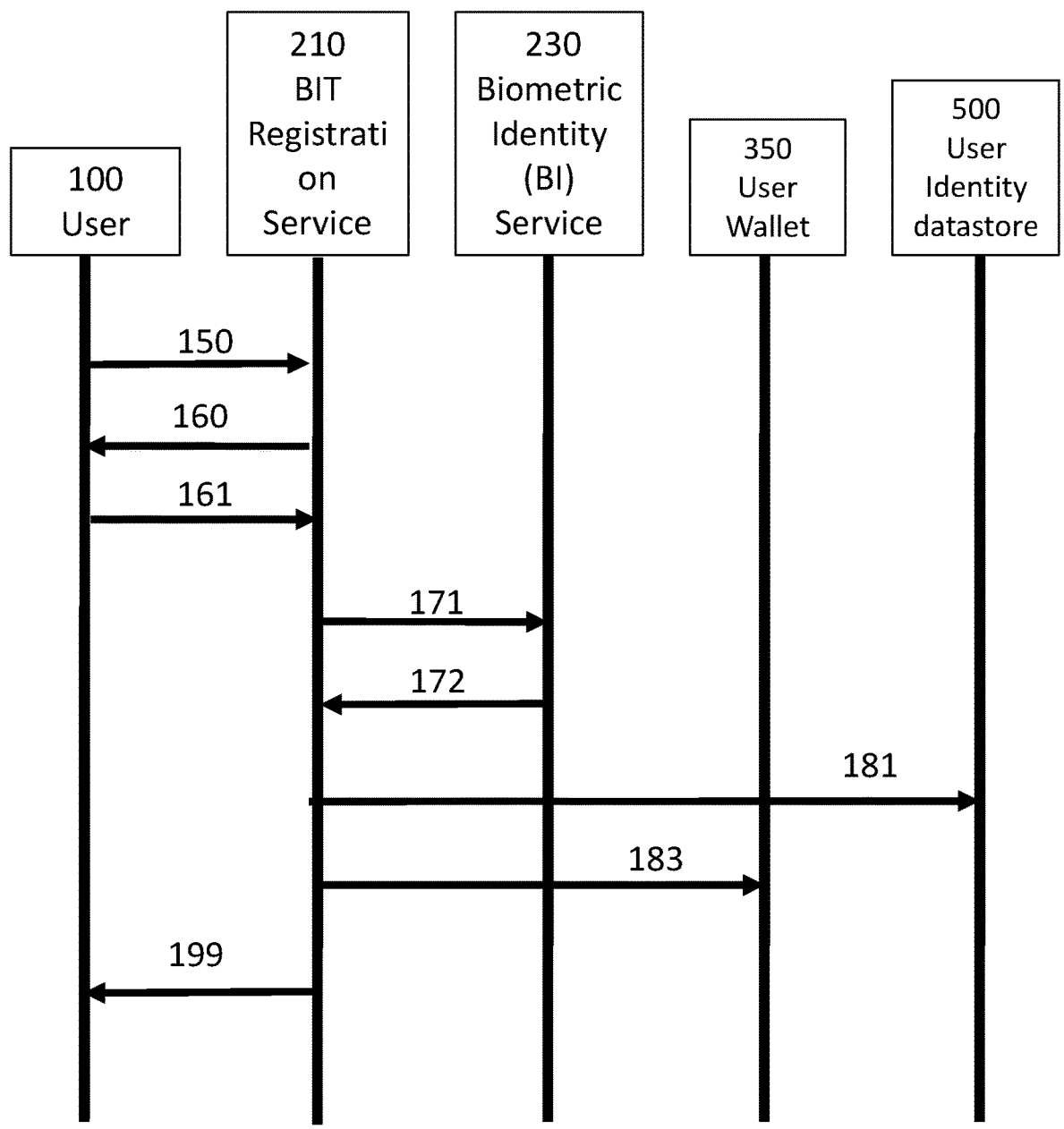
FIG. 6A is a flowchart depicting an example process for user registration.
Figure 6B:
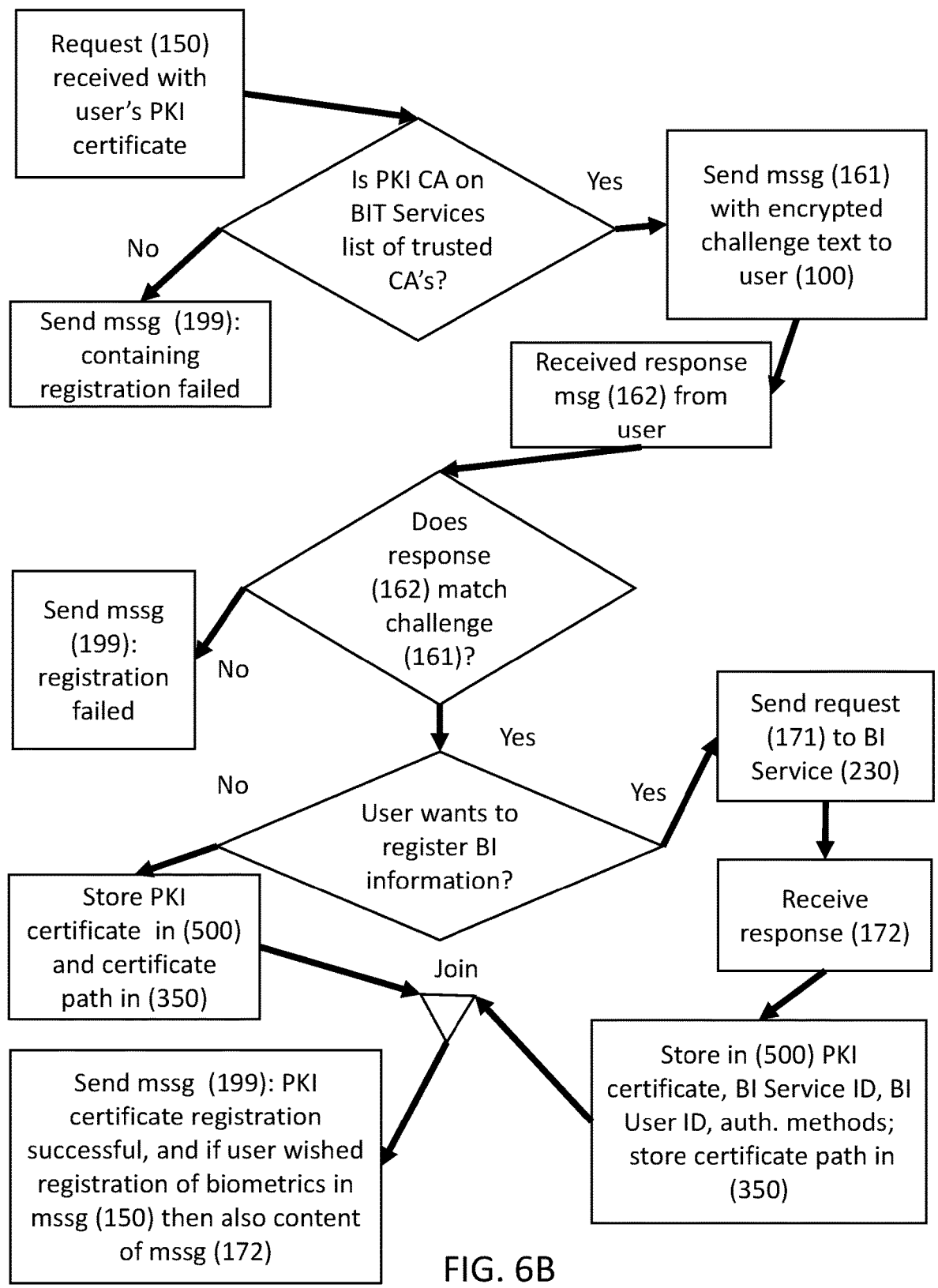
FIG. 6B is a flowchart depicting the decisions made during the user registration of 6B.

Referring now to FIG. 6A, a flowchart depicting an example method for user registration on the blockchain identity translator 200 is provided. FIG. 6B is a flowchart depicting the decisions made during the user registration of 6A. This exemplary method includes obtaining biometric information from a biometric identity service provider 230 and obtaining blockchain account information from the user wallet 350.

FIG. 6A and FIG. 6B depict a user 100 making a request 150 to register the user's blockchain account and her PKI certificate with the Blockchain User Registration Service 210 of the Blockchain Identity Translator 200. In this example the user's 100 PKI certificate and/or blockchain account information are included in the request 150.

In other embodiments, the request 150 may also include a request that the user 100 also wishes to register biometric information. In this scenario the request 150 will also include the identification of the user's BI Service that she wishes to use, and optionally a user ID (i.e., the user's 100 BI User ID that is used by the BI Service 230 to identify her, if she is already enrolled). Note that registering with a BI Service 230 is an optional step, though it may be advantageous for a user to do so.

The response message 199 is used by the BIT Registration Service 210 to inform the user 100 if the registration request was successful or not (i.e., whether the user's blockchain account, PKI certificate, and/or biometric information were registered with the Blockchain Identity Translator 200).

In this example the Blockchain Identity Translator 200 keeps a list of certificate authorities that it trusts. The BIT Registration service 210 checks that the user's certificate is valid using best practices in the state-of-the-art for public key infrastructures. For example, in some embodiments the BIT Registration service 210 will check that (a) the certificate was issued by a certificate authority by checking the certificate against a list of trusted certificate authorities known to the BIT Registration Service 210, and (b) the certificate's digital signature is valid by using the certificate authority's public key.

If the certificate is not valid, the user 100 is informed of the failure of her PKI certificate registration in the response message 199.

In this example, if the certificate is valid, the BIT Registration Service 210 optionally sends, to the user 100, a challenge message 160 that contains a randomly selected challenge text that is encrypted with the user's public key stored in the certificate (and as provided by the user in the request message 150). The user decrypts the challenge text using her private key corresponding to the public key stored in her certificate, and then sends the decrypted challenge text to the BIT Registration Service 210 in a response message 161.

If the BIT Registration service 210 receives message 161, it compares the randomly selected challenge text, which was encrypted and sent to the user 100 in the message 160, to the decrypted text received from the user 100 in the response message 161.

If the two are not equal, the user's registration request 150 is denied and the failure to register the user's PKI with the BIT Registration Service 210 is indicated in the response message 199. In some embodiments, this challenge process (described in paragraphs 73, 74, and here) is optional. In other embodiments, if the response to the challenge question is incorrect, the user may be prompted to try again. If, after a set number of attempts, the response is still incorrect, the Blockchain Identity Translator 200 will reject the response and end the registration process. In some embodiments the user will be notified that the registration process was unsuccessful. The Blockchain Identity Translator 200 may also log a failed registration attempt.

If the two are equal, then the user passes the challenge—the BIT Registration Service 210 is assured that the user is in possession of the PKI private key matching the public key stored in the PKI certificate. In some embodiments the BIT Registration Service 210 indicates, in the response message 199 to the user 100, that her PKI certificate was successfully registered.

If the PKI certificate was successfully validated, the Registration Service 210 stores 181 the user's PKI certificate in the user identity datastore 500.

In another embodiment, if the user's 100 PKI certificate was successfully validated by the challenge or other means known to the state-of-the-art, and the request 150 indicated that biometrics are to be registered, the BIT registration service 210 begins the biometric registration process. In this example, the BIT Registration Service 210 checks that the BI Service 230 (which was included in the registration request message 150) is on the list of trusted BI Services 230 known to the Blockchain Identity Translator 200.

If the BI service 230 is not on the list, then the BIT Registration Service 210 informs the user 100 in the response message 199 that she is not registered for authentication with biometrics on that BIT Registration Service 210.

If the BI service is on the BIT Services 200 list of trusted BI Identity services, the BIT Registration Service 210 sends a request message 171 to the BI service 230 to confirm that the user 100 is registered with the BI Service 230. The request message 171 includes the user's permission (e.g. in the form of an access token) for the BI service 230 to provide user registration confirmation to the BIT registration service 210.

The BI Service 230 then returns a response message 172 indicating that either: (i) the user 100 is not registered with the BI Service 230, or (ii) that the user is registered with the BI Service 230. If the user is registered with the BI service, the secure response message 172 will also include the authentication methods and information (e.g., two-step authentication, or biometric authentication such as iris scan and/or fingerprints) that are available for authenticating the user. A notice of information received in the message 172 and optionally confirmation of intended purposes of the information is included in the response message 199 to the user 100.

This biometric information is then securely stored in the User Identity datastore 500. This biometric information can include, but is not limited to, the authentication methods and information registered for the user 100 with the BI Service 230 (e.g., iris scan, palmprint, voice-, retina-, face-, and/or fingerprint), the BI Service ID (i.e., the identification of the Biometric Identity BI Service 230), and the user's 100 BI User ID.

In another embodiment, the BIT Registration Service 210 stores 183 the certificate path (i.e., the location of the certificate) in the Blockchain User Wallet 350. Information in the certificate path includes, but is not limited to, information related to accessing the user's certificate in the user identity datastore 500 and a hash of the user's certificate.

In some embodiments the Blockchain User Wallet 350 is stored on the Blockchain 390

Figure 7:
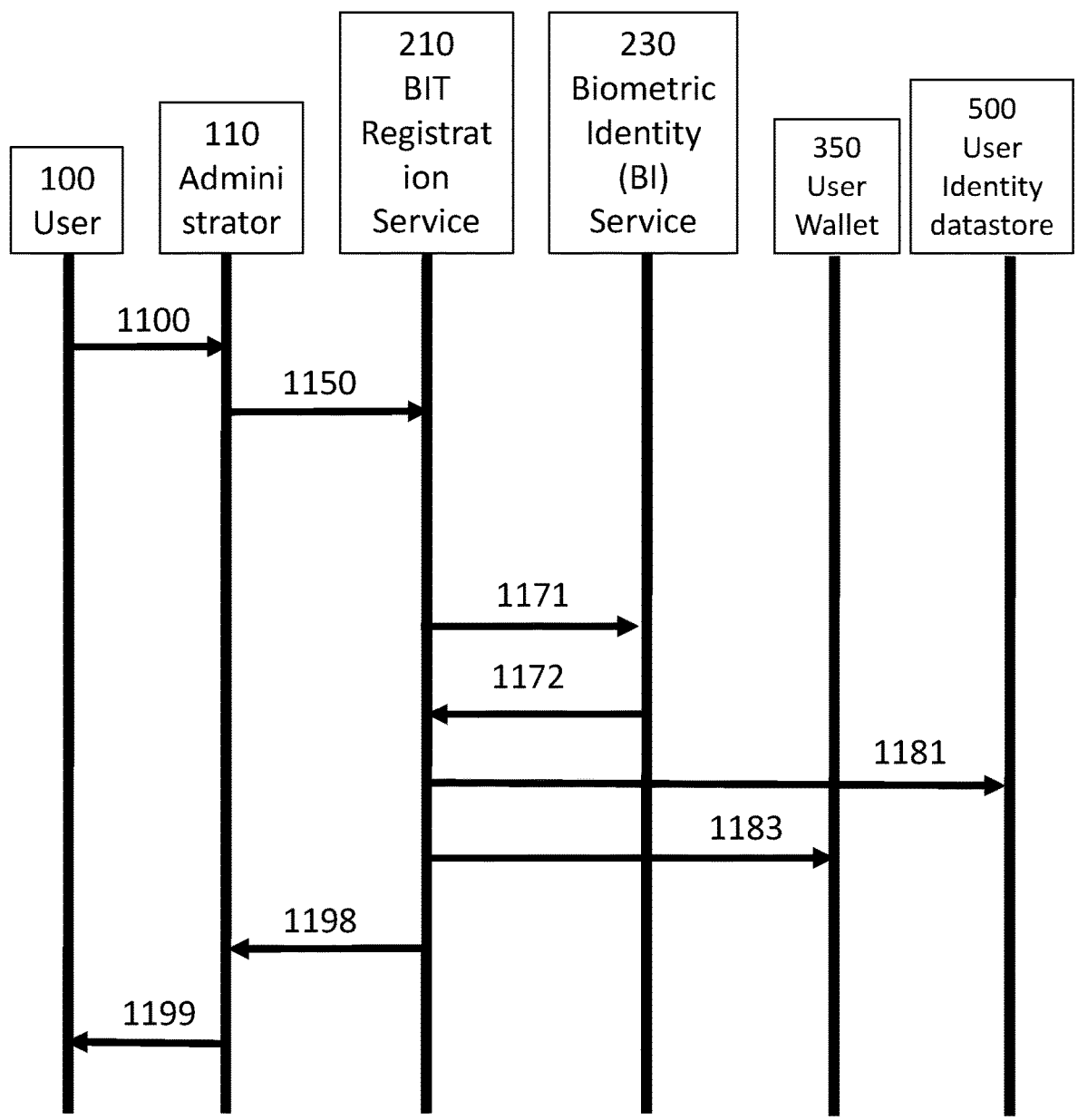
FIG. 7 is a flowchart depicting an example process for user registration via an administrator.

Referring now to FIG. 7, a flowchart depicting an example process for user registration via an administrator is provided. This embodiment depicts a scenario where an administrator 110 is responsible for registering users 100.

In this embodiment where an administrator 110 of the Blockchain Identity Translator 200 knows the user 100 has a valid identity (e.g. as a verified company employee), the administrator may register the user 100 with the User Registration Service 210.

In this embodiment the user 100 makes a request 1100 of the BIT Services administrator (110) to register her PKI certificate and provides the administrator with the user's 100 PKI certificate, blockchain account information, and optionally, the BI Service ID (that is, the identity of the BI Service 230 to be used for her authentication, together with the user's 100 BI User ID, which is used by the Biometric Identity Service Provider 230 to identify the user 100).

The response message 1198 is used by the BIT Registration Service 210 to inform the administrator 110 if the registration of the PKI was successful or not and if the registration of her biometrics authentication was successful or not. It will be appreciated that the response message 1198 can be sent once the user is registered, or once the user's registration is rejected.

In some embodiments the BI Service Provider 230 trusts the BIT Registration service 210 and allows the BIT Registration service 210 to obtain a user's biometric information. For instance, in some embodiments the BI Service Provider 230 includes an API that the BIT Registration Service 210 can query in order to obtain biometric information associated with a user's 100 BI User ID.

To begin the registration, the Administrator 110 sends a message 1150 to the BIT Registration service 210.

The BIT Registration service 210 checks that the user's PKI certificate is valid. That is, it checks whether the certificate (i) has been issued by a certificate authority that is in its list of trusted certificate authorities, and (ii) that the certificate's digital signature is valid (by using the certificate's authority's public key to validate the certificate's digital signature).

If the certificate is not valid, the BIT Registration Service 210 informs the administrator 110 (via a message 1198) of the failure to register the user. The administrator 110 then informs the user 100 (via a message 1199) that her registration with the BIT Registration Service 210 was not successful.

If the user's (100) PKI certificate was successfully validated and the user 100 indicated in the request 1100 that she wishes to register her biometric information, the BIT Registration Service 210 checks that the BI Service 230 (as identified by BI Service ID that the user 100 included in her registration request 1100) is on the list of trusted BI Services kept by the BIT Services 200.

If the BI Service 230 is not on the list, then the BIT Registration Service 210 informs the administrator 110 that the user is not registered for authentication using BI Services 230.

If the BI Service 230 is on the BIT Services 200 list of trusted BI Identity services, the BIT Registration Service 210 sends a request message 1171 to the BI service 230 to confirm that the user 100 (as identified by her BI User ID) is registered with the BI Services 230 for authentication. The request message 1171 includes the user's 100 permission (e.g. in the form of an access token) for the BI service 230 to provide user registration confirmation to the BIT registration service 210.

The BI Service 230 responds with the message 1172 informing the BIT Service whether the user 100 is registered with the BI Service 230 and, if the user is registered, for which types of authentication methods (e.g., two-factor and/or iris scan and/or fingerprints).

If the PKI certificate was successfully validated, the Registration Service 210 stores the user's PKI certificate in the User Identity datastore 500.

If the user was registered with the BI Service 230 for authentication (as indicated in 1172), the BIT Registration Service 210 also stores the authentication information received in the message 1172, together with the BI User ID and the BI Service ID in the User Identity datastore 500. In this embodiment a message 1181 with the data is sent to the User Identity datastore 500.

Furthermore, the BIT Registration Service 210 is also configured to store the certificate path (which identifies the location of the certificate) in the User Wallet 350. In some embodiments the User Wallet 350 is stored on the Blockchain 390. The certificate path provides information to access the user's certificate in the User Identity datastore 500. The certificate path also includes the hash of the user's certificate in the User Wallet 350. In this embodiment a message 1183 is sent to the User Wallet 350 to store the certificate path.

If the registration is successful the administrator 110 informs the user 100 of the successful registration of her PKI certificate (and notice of storage of any BI authentication information when requested) in the message 1199.

In another example, the Blockchain Identity Translator also includes a BIT Distributed Application (DApp) Registration service.

A DApp 400 is a collection of smart contracts and related web services that provide a business application's functionalities.

Users can utilize a DAapp while being identified only by the blockchain account, which may be represented by a large hexadecimal address, that, on its own, does not reveal the real identify of the user; thus, the user can utilize DAapp's services anonymously by requesting services only by using her blockchain account information. However, when a DApp needs to know the user's real identity, it asks the Blockchain Identity Translator about it. It is assumed for the following description, that both the user and DApp are already registered with the BIT Services.

A DApp that is registered with the Blockchain Identity Translator 200 can use the Blockchain Identity Translator 200 to identify users and as a login/authentication provider for the DApp. This allows the developer of the DApp to focus on the business logic on the DApp rather than the login and/or authorization framework.

Figure 8:
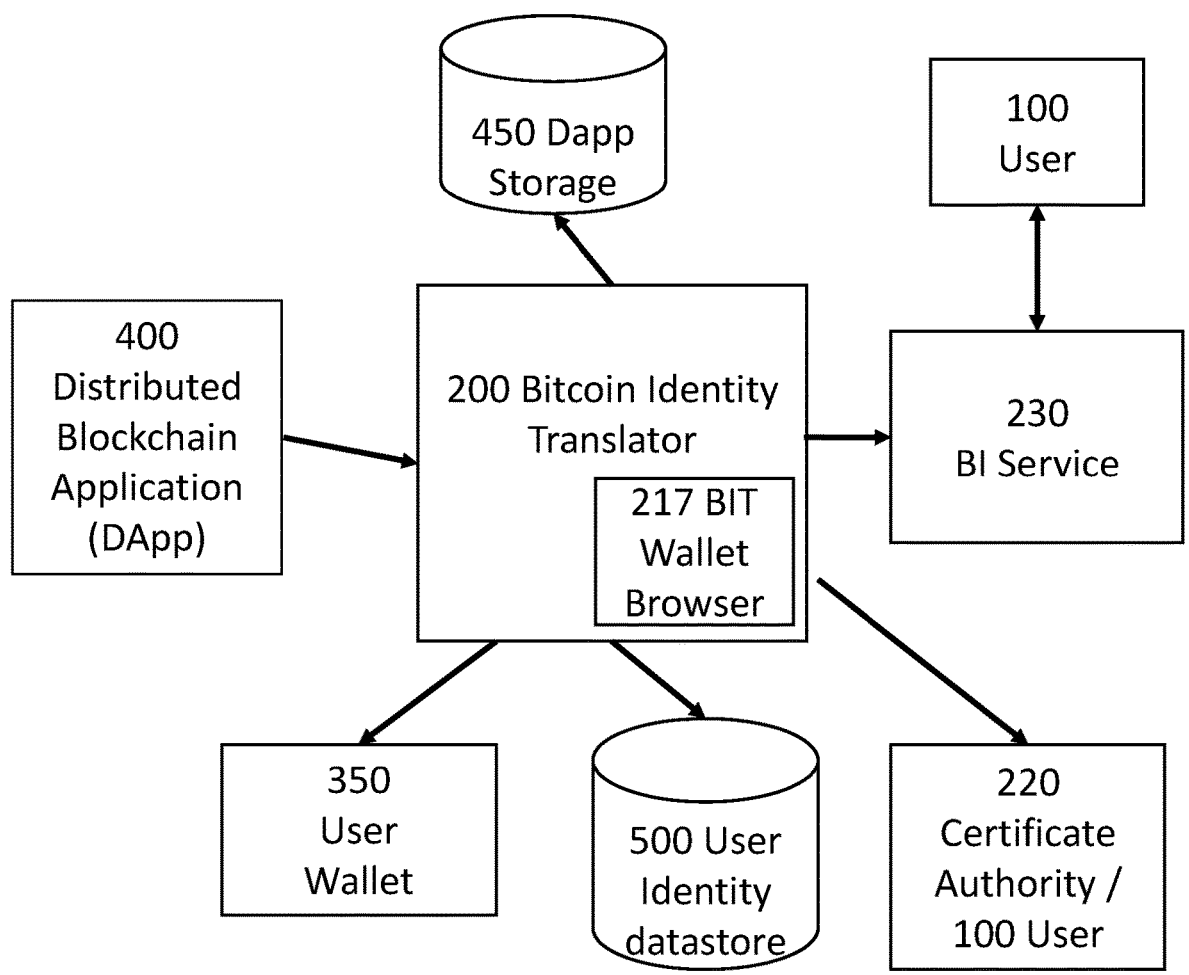
FIG. 8 is a schematic diagram depicting an exemplary high-level architecture of a Blockchain Identity Translator, a DApp, and a BIT Wallet Browser.

In an example, FIG. 8 is a schematic diagram depicting an exemplary high-level architecture of a blockchain identity translator (BIT) 200, a DApp 400, and a BIT Wallet Browser 217. The BIT 200 is configured to retrieve and process data from DApp storage 450, the user's user wallet 350, the User Identity datastore 500, the Certificate Authority 220, and the Biometric Identity Service 230.

In an example embodiment the Blockchain Identity Translator 200 is configured to connect to a DApp storage 450. The DApp storage is configured to store, among other things, information about the authentication requirements of a DApp 400. In some embodiments the DApp storage 450 may be implemented in the same database, datastore, or location as the User Identity Datastore 500.

In other embodiments the DApp Storage (and, in some cases the User Identity Datastore 500 also) may be separated. FIGS. 9A, 9B, 9C, and 9D are schematic diagrams depicting different example architectures for DApp storage 450.

Figure 9A:
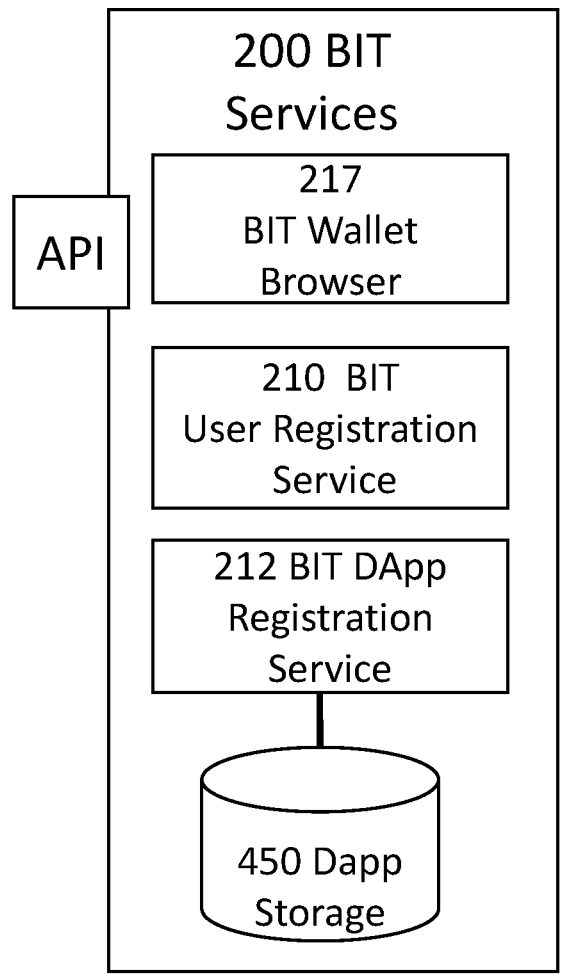
FIG. 9A is a schematic diagram depicting an alternate example blockchain identity translator.

As depicted in FIG. 9A, the DApp storage 450 is in the same location as the Blockchain Identification Translator 200.

Figure 9B:
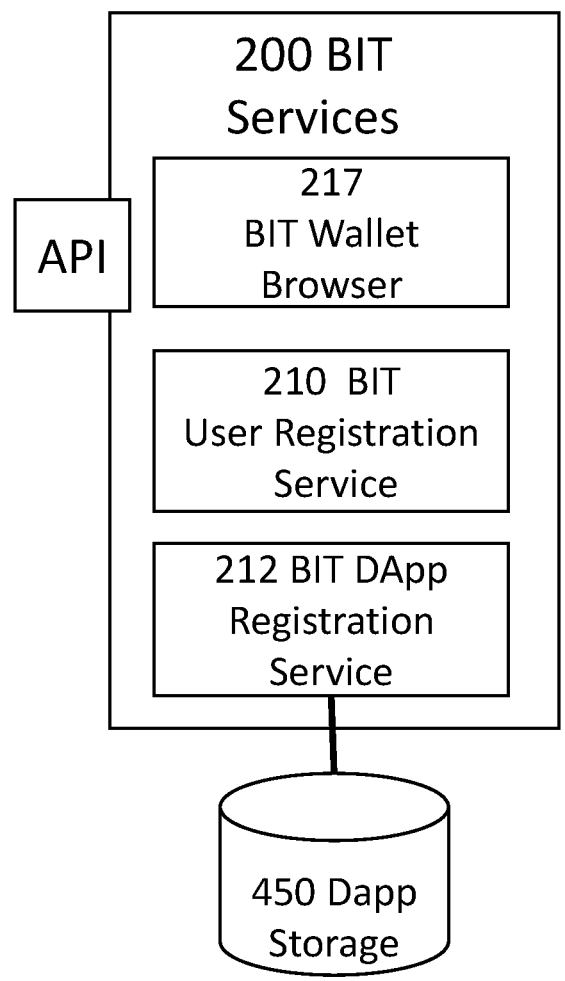
FIG. 9B is a schematic diagram depicting an alternate example blockchain identity translator.

In an alternate embodiment as depicted in FIG. 9B, the DApp storage is stored external to the Blockchain Identification Translator 200. For instance, in the example depicted in FIG. 9B the DApp storage may be implemented remotely on a InterPlanetary File Store (IPFS), remote filesystem, a remote database, or across cloud storage systems.

Figure 9C:
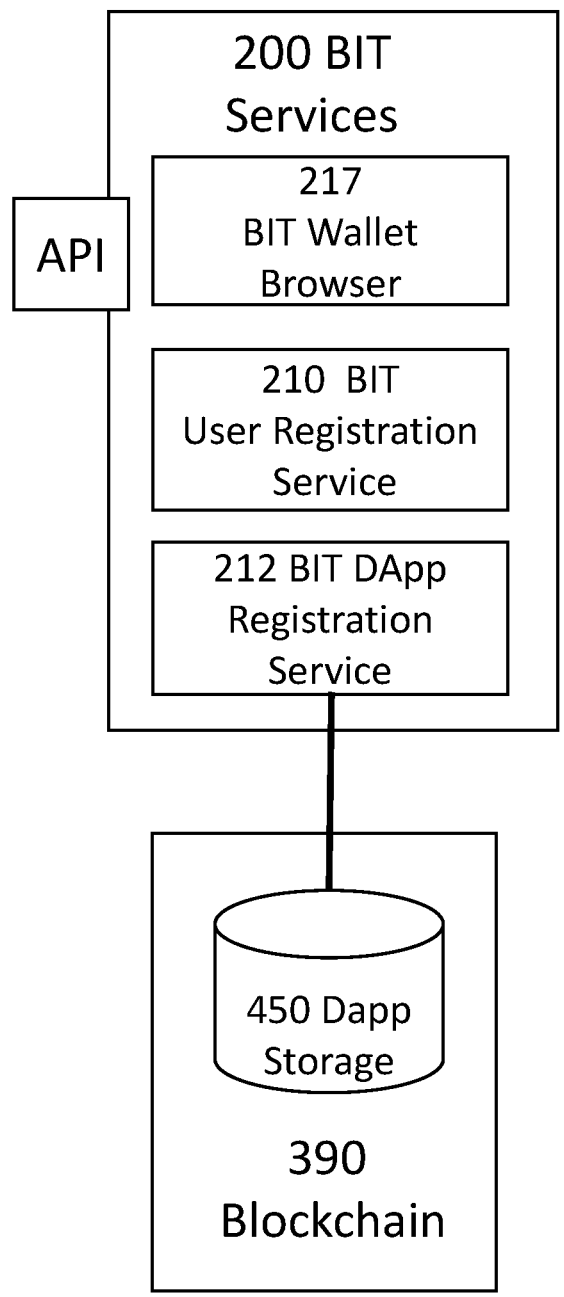
FIG. 9C is a schematic diagram depicting an alternate example blockchain identity translator.

In yet another embodiment as depicted in FIG. 9C, the DApp storage is implemented on the blockchain itself.

Figure 9D:
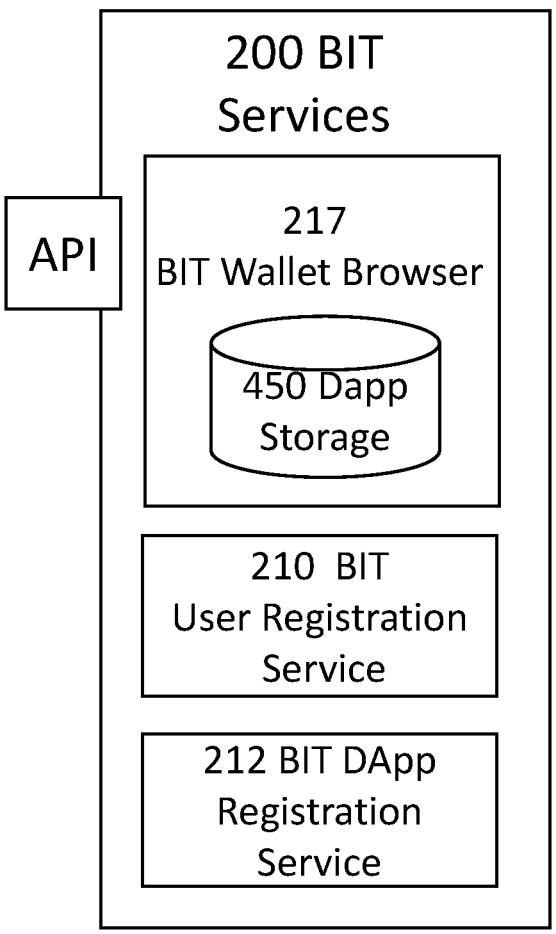
FIG. 9D is a schematic diagram depicting an alternate example blockchain identity translator.

In yet another embodiment as depicted in FIG. 9D, the DApp storage is implemented in the BIT Dapp Service 212.

Figure 10:
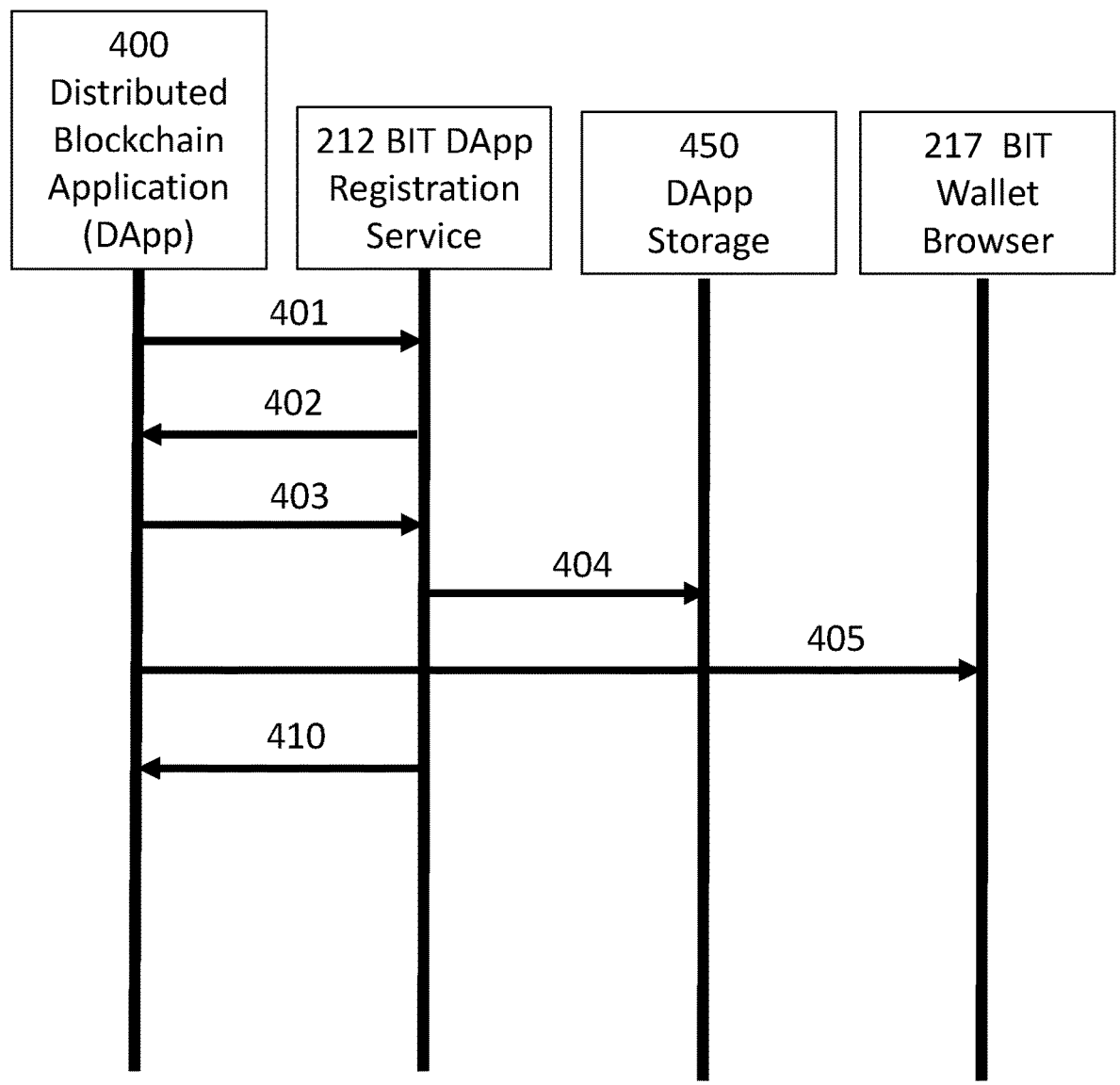
FIG. 10 is a flowchart depicting an example process for Distributed Application (DApp) registration.

Before a DApp 400 can use BIT Services 200, it must register with the BIT DApp Registration service 212. FIG. 10. is a flowchart depicting an example process for the registration of a DApp with the Blockchain Identity Translator's DApp registration service 212.

As depicted in FIG. 10, the DApp 400 sends a DApp registration request 401 to the BIT DApp Registration service 212. The service 212 responds with a request 402 for credentials to be used to authenticate the DApp 400 in the future requests for services by the DApp for BIT services 200. It also asks the DApp 400 (in the message 402) what type of default user identification and authentication methods are required by the DApp 400.

Examples of default User identification and authentication methods can include, but are not limited to:

User Identification Only—it suffices to check that the user is registered with the BIT Service (200). This may or may not include biometric information related to the user;

User Confirmed Identification—it is checked that the user is registered with the BIT Services (200) and it is also checked with the user's certificate is not on the certificate authority's list of revoked credentials. This may or may not include biometric information related to the user.

User authentication may or may not be required by the DApp 400, but if it is required, it can be any one or a combination of methods such as user name/password, two-factor, or authentication with biometrics.

The DApp 400 then replies with a message 403 with the credentials to be used by the BIT Services 200 to authenticate the DApp 400 when it requests BIT services. It also includes in the message 403 its selection of the default method(s) of user identification and/or authentication by BIT services.

Once the BIT DApp Registration service 212 receives the reply (message) 403, it sends a request to the DApp Storage to record/store 404 the information included in the message 403 in the DApp Storage 450. It then sends the DApp 400 a successful registration message 410.

Figure 11:
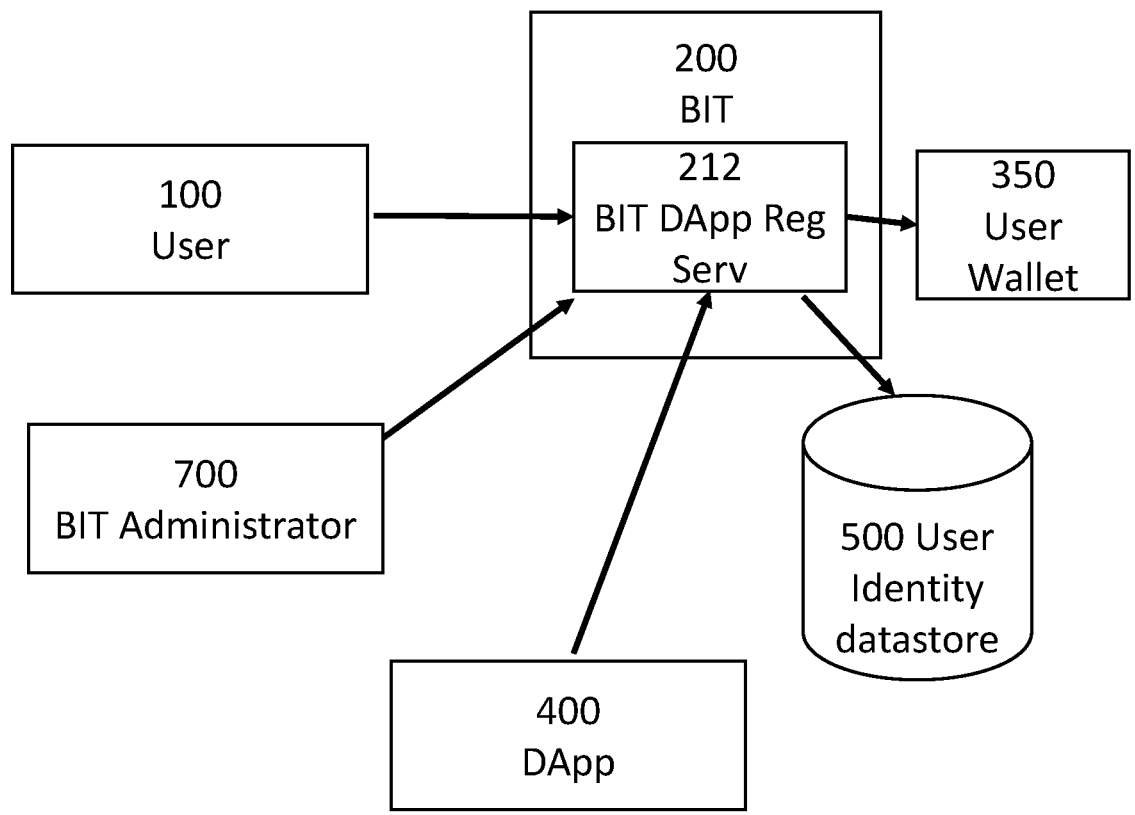
FIG. 11 is a schematic diagram depicting a bit wallet browser as used in an embodiment of the blockchain identity translator.

FIG. 11 is a schematic diagram depicting a BIT DApp Registration Service 212 as used in an embodiment of the blockchain identity translator 200. The BIT DApp Registration Service 212 is configured to allow secure access to the user's Blockchain User Wallet by the user, by DApps (to identify or authenticate, at least in part its users), and/or by the BIT Administrator.

Figure 12:
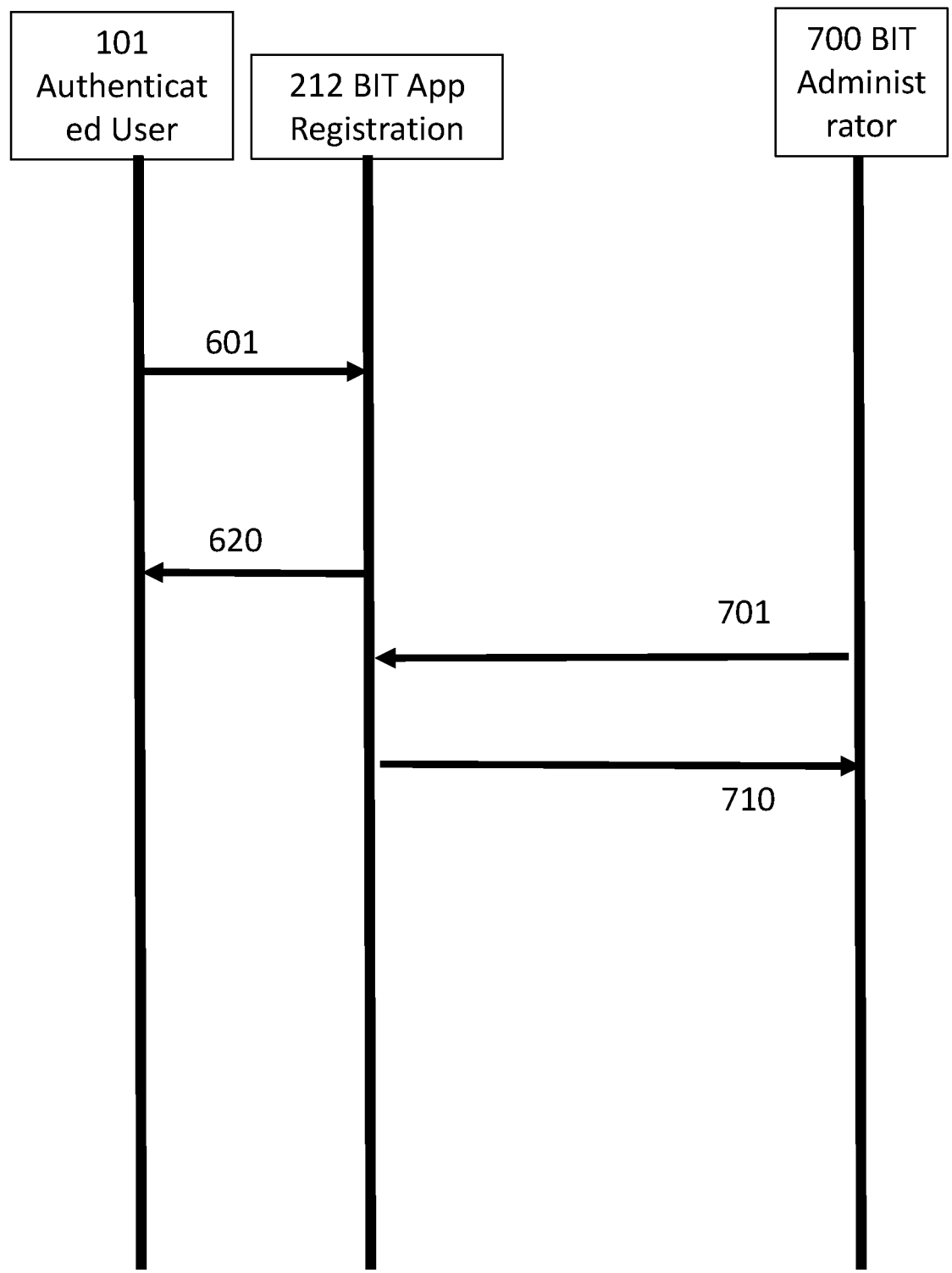
FIG. 12 is a flowchart depicting an example process for Distributed Application (DApp) registration.

FIG. 11 and FIG. 12 (in part) show a BIT Administrator 700 accessing the Blockchain Identity Translator 200 to manage information in the Wallet 350 and in the User Identity Datastore 500. The figure also shows the user 100 accessing the Blockchain Identity Translator to retrieve and manage her information external to and in her User Wallet (350) and in the User Identity Datastore 500. The user includes in the request information that is used to search for information in the user's wallet and the storage. DApp 400, the Distributed Application, uses the services of the Blockchain Identity Translator, as described in FIG. 13.

Referring now to FIG. 12, an exemplary process for DApp registration is depicted. The process depicts a request for information from the BIT DApp Registration service 212 by the user 100.

An authenticated User (101) first makes a request (601) to the BIT DApp Registration Service (212) to access and manage information in her account, and eventually the User Identity datastore 500. The request 601 includes information used to identify the DApp, and identification of the user's preferred methods for authenticating to and accessing the DApp.

Then the BIT DApp Registration Service 212 sends, in the message 620 to the user 100, a message relating success or not success of the user's subscription or de-registration from the DApp, if any.

Referring again to FIG. 12, a process depicting a Blockchain Identity Translator Administrator 700 interacting with the BIT DApp Registration Service (212) is depicted. In this example the BIT Administrator 700 sends a request 701 to the BIT DApp Registration Service (212). The request includes a request to manage information used to identify the DApp, and identification of the preferred methods for authenticating to and accessing the DApp. The BIT DApp Registration Service (212) then sends a reply 710 the BIT Administrator 700 of the result of the Administrator's request 701.

Figure 13:
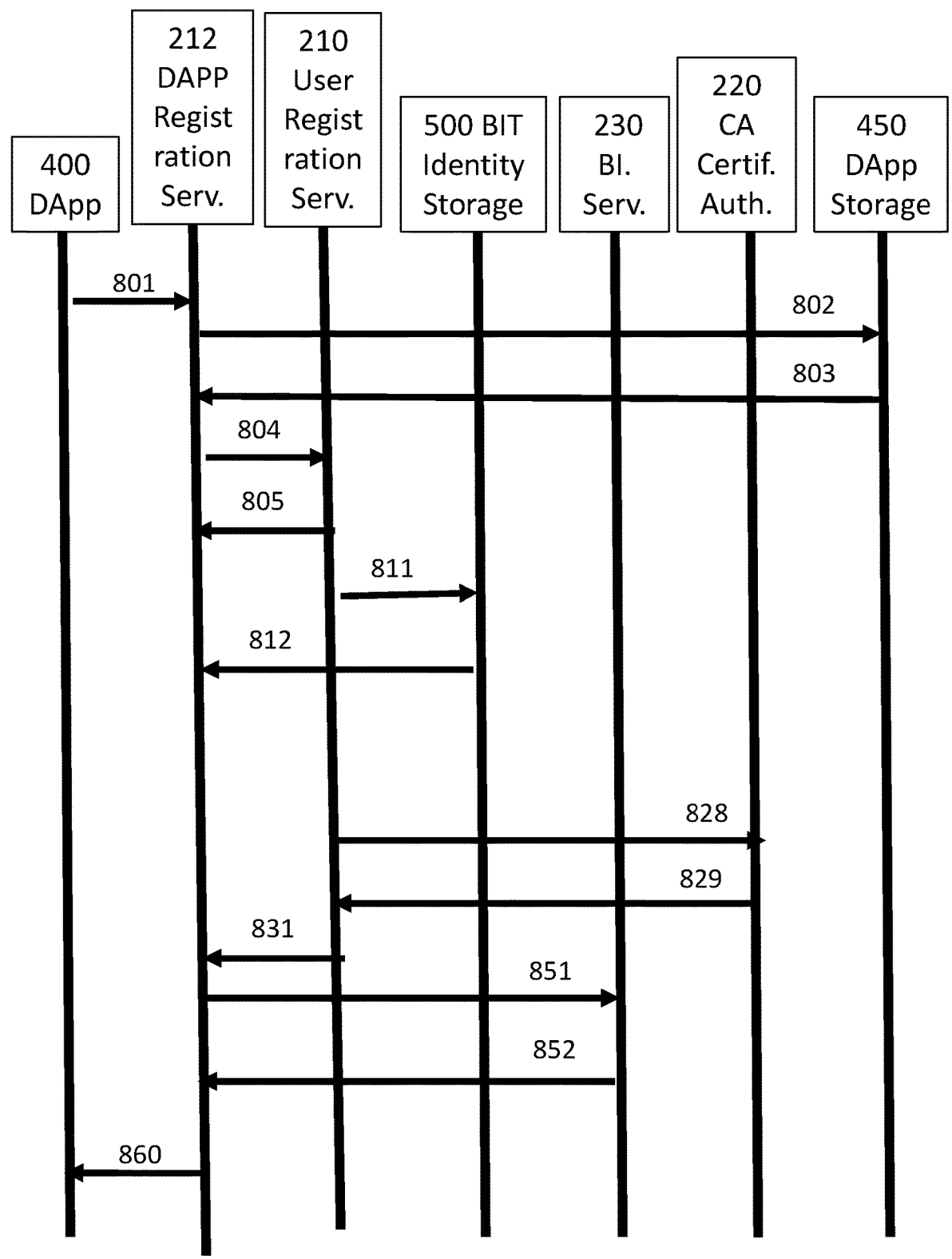
FIG. 13 is a flowchart depicting an example process for Distributed Application (DApp) registration.

Referring now to FIG. 13, an exemplary process for a DApp 400 to request services from a user's BIT DApp Registration Service (212) is depicted. Examples of services include, but are not limited to, user registration/de-registration to/from a Dapp, identification and/or authentication of a user.

In this embodiment, when the DApp 400 requires user membership services such as updating user identification and/or authentication methods, it sends a request 801 to the DApp Registration Service 212. In some embodiments, the DApp 400 may specify in 801 what type of identification and/or authentication users should use with the DApp 400. If the DApp 400 specifies the type of identification and/or authentication in the (update) request, the request will override any methods of identification and/or authorization previously stored as default options (for instance, when the DApp initially registers with the blockchain identity translator).

In some embodiments the DApp Registration Service 212 also checks that the DApp 400 is registered with the BIT Services 200 by sending a request 802 to the DApp Storage 450 (which contains information on registered DApps 400). The DApp Storage 450 is configured to respond with an indication 803 of whether the DApp is registered with the BIT Services 200. The DApp Storage 450 may also respond with information related to the default identification/authentication methods used by the DApp 400. If the DApp 400 is not registered then an error indication is returned in the message 860 to the DApp 400. Otherwise the process continues.

Once the DApp 400 has been verified, the DApp Registration Service 212 then contacts the User Registration Service 210, which manages the users' certificates. In this embodiment, DApp Registration Service 212 sends a request 804 to the User Registration Service 210, to determine if the user has successfully registered and the user's certificate has not been revoked by the most recent periodic check of the Revoked Certificates List.

A response 805 from the User Registration Service 210, to the DApp Registration Service 212 is then sent indicating whether the user is successfully registered. If not, then an error is indicated in the message 860 returned to the DApp 400. Otherwise the process continues.

In some embodiments the DApp 400 may require confirmed identification and/or user authentication. Confirmed identification and/or user authentication require additional processing before a final response 860 can be sent to the DApp 400.

In some embodiments (e.g., when the DApp 400 requires confirmed identification or when the DApp 400 requires that the user be authenticated, optionally with biometrics), User Registration Service 210 sends a request 811 to the User Identity datastore 500 to retrieve the user's PKI certificate and the authentication information. The BIT Identity Storage then returns the user's PKI Certificate and authentication information, if found, in a response 812. The authentication information contains (i) BI Service ID, which identifies the BI Service 230 to perform authentication, (ii) the BI User ID, which is a user identification number used by the BI Service 230, and (iii) the authentication methods to be used by the BI Service 230.

In some embodiments, the DApp 400 requires authentication. In this embodiment the DApp Registration Service 212 will make a request 851 to the BI Service 230 to authenticate the user 100 prior to sending a response 860 to the Dapp 400. The BI Service 230 uses the state of the art methods to authenticate the user and informs 852 the DApp Registration Service 212 of the result via a response message 812, which is then communicated to the DApp 400 in the message 860.

When the DApp 400 requires confirmed identification, the User Registration Service 210 also checks with the Certificate Authority 220, via a request 828, to determine whether the certificate has been revoked. In this embodiment the User Registration Service 210 sends a request 828 to the Certificate Authority 220 for the Certificates Revocation List. The Certificates Revocation List is then returned to the User Registration Service 210 in a response 829. The User Registration Service 210 then checks if the user's certificate, as received from the User Identity datastore 500, is on the revocation list. If it is, the User Registration Service 210 communicates (831) with the DApp Registration Service 212, which then sends, to the DApp 400, a response 860 indicating that the user's certificate has been revoked. Otherwise the DApp Registration Service 212 indicates in the response 860 to the DAapp 400 that the user has been identified with confirmation (i.e., that the user's certificate is not on the Certificates Revocation List).

Figure 14:
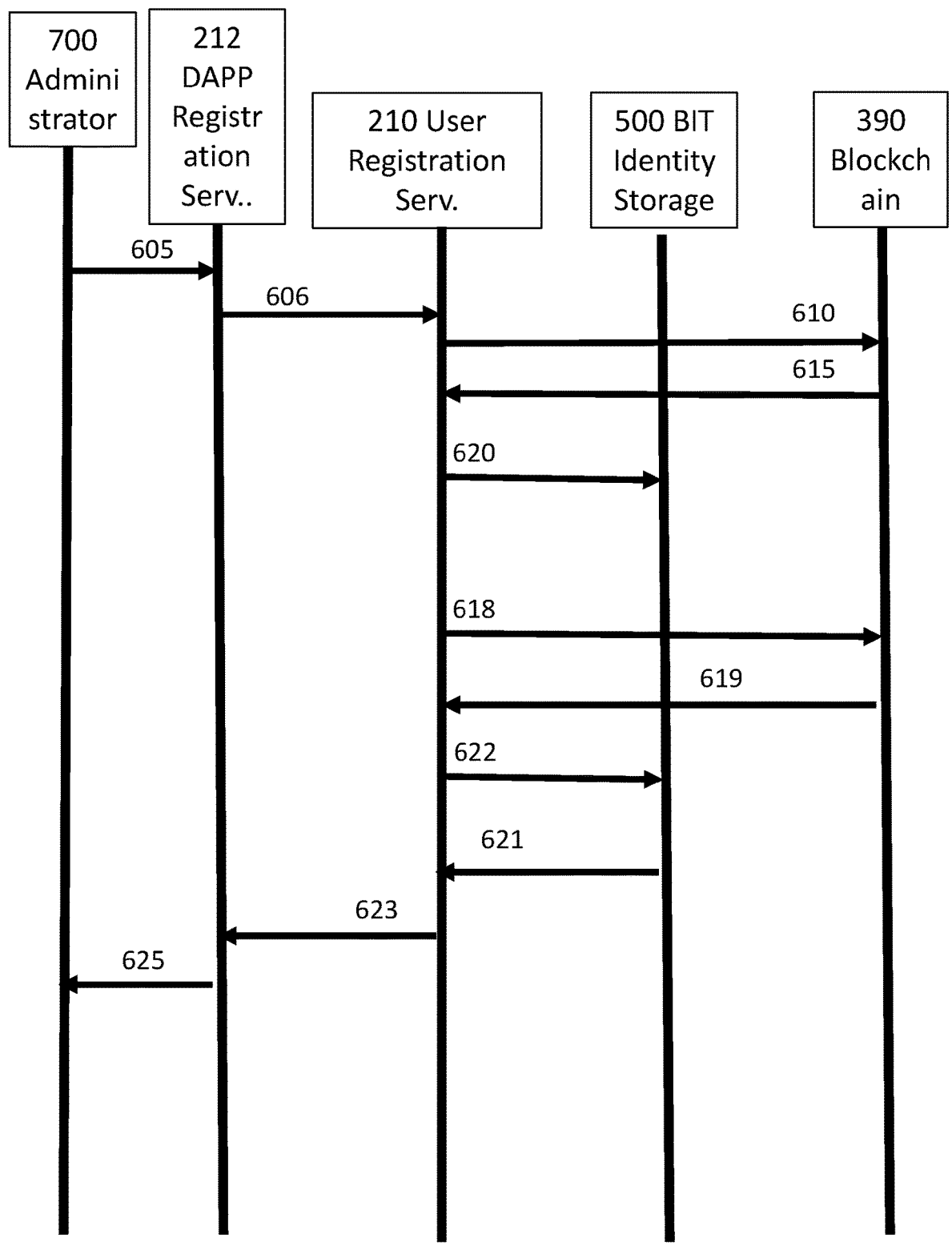
FIG. 14 is a flowchart depicting an example process for registering one or more users and/or administrators of a DApp with a DApp Registration Service.

Referring now to FIG. 14, a flowchart depicting an example process for registering one or more users and/or administrators of a DApp with a DApp Registration Service 212 is provided. In this example an administrator 700 submits a message 605 that includes a list of administrators and/or regular users that are to be associated with one or more DApps. The DApp Registration Service 212 forwards the list in a message 606 to the User Registration Service 210. The User Registration Service 210 then sends a request 610, which includes the list of users (administrator and/or regular), to the Blockchain 390 so that the users are registered on the blockchain 390.

The Blockchain 390 is configured to register users on the blockchain 390. Once the user has been registered on the blockchain 390, the blockchain 390 returns (in a message 615) a user identifier (e.g. username) or a new blockchain account address for each user.

It will be noted that a list can have one or more list entries. Furthermore, some blockchains (e.g. Hyperledger) may not return an identifier in the message 615 if the User Registration service 210 first stipulated the identifier in the request 610, and the blockchain used the identifier stipulated in the request (since it would be redundant).

Once the Blockchain 390 has returned the message 615, the User Registration Service 210 sends a message 620 to the BIT Identity store 500 for each user in the list. This then records the contents of the message 615 in the BIT Identity Store 500. This information can include, but is not limited to, the identifier or new blockchain account address from the blockchain fabric.

The User Registration Service 210 is further configured to issue a transaction 618 to store the user's PKI digital certificate path to the blockchain 390. The blockchain 390 returns a transaction identifier, or the blockchain address of the transaction and/or a status flag indicating successful (or unsuccessful) transaction commit in a message 619. A request 622 is then made for the transaction ID (or transaction's blockchain address) to be associated with a user and stored in the BIT Identity Storage store 500.

In an embodiment, the BIT Identity Storage 500 is configured to store, at least temporarily, the transaction identifier (or the blockchain address of the transaction and/or a status flag indicating successful or unsuccessful transaction commit) may be stored in the BIT Identity storage before verifying whether the transaction has been committed in the blockchain 390. In this scenario, the User Registration Service 210, the BIT Identity Storage 500, or both are further configured to take compensating actions if the commit phase is unsuccessful. For example, the User Registration Service 210 may reattempt to store the user's PKI digital certificate path to the blockchain 390. In another example, the User Registration Service 210 may indicate, in a response message, that the registration has failed.

A response message 621 with an indication of success (or failure) is sent to the User Registration Service. The User Registration service sends a message 623 to the DAPP registration service recording success or failure of users registering for the DApp. A final message 625 indicating success or failure for registering the user(s) for particular DApps is sent to the administrator 700.

In subsequent workflows, the BIT services may use the transaction ID or the transaction's blockchain address, as stored in the BIT Identity Storage 500, to retrieve the certificate path from the blockchain 390. Using the certificate path information, the certificate may be securely loaded into memory from distributed storage.

It will be appreciated that the examples as described above may be implemented on a computer, such as a general purpose computer or a specialized computer having a application specific integrated circuit (i.e., ASIC). The computer may include a processing unit having one or more processors and a non-transitory computer-readable storage medium that may include, for example, volatile and/or non-volatile memory.

The memory may store one or more instructions to program the processing unit to perform any of the functions described herein. The computer may also include other types of non-transitory computer-readable medium, such as storage (e.g., one or more disk drives, solid state drives, flash memory) in addition to the system memory. The storage may also store one or more application programs and/or external components used by application programs (e.g., software libraries, operating systems, etc.), which may be loaded into the memory.

The computer may have one or more input devices and/or output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. The input devices may include a microphone for capturing audio signals or a video camera for capturing video signals. The output devices may include a display screen for visually rendering, and/or a speaker for audibly rendering, recognized text.

The computer may also comprise one or more network interfaces to enable communication via various networks. Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A blockchain identity translator comprising:
   a user identity datastore for storing user data, the data including an electronic identity information of a user and an anonymous blockchain account information of the user;
   a network connection for communicating with a device on a network;
   a user registration service configured to obtain a digital certificate through a network request to the user or a certificate authority, the digital certificate being issued by the certificate authority and being associated with the user;
   a user registration service processor configured to obtain the anonymous blockchain account information of the user through a network request to a remote blockchain account provider on the network; and
   wherein, the blockchain identity translator is configured to process a request from the device on the network, determine the electronic identity information of the user from the anonymous blockchain account information of the user, and provide a response to the device on the network, the response including the electronic identity information of the user.

2. The blockchain identity translator of claim 1, wherein the user registration service is further configured to obtain a biometric identity information of the user through a network request to a remote biometric identity service provider on the network; and to associate the biometric identity information of the user with the verified electronic identity information of the user.

3. The blockchain identity translator of claim 1 wherein the user identity datastore is integrated with the blockchain identity translator.

4. The blockchain identity translator of claim 1 wherein the user identity datastore is remotely located, on the network, from the blockchain identity translator.

5. The blockchain identity translator of claim 1 where in the user identity datastore is on the blockchain.

6. The blockchain identity translator of claim 1, further comprising a BIT Dapp Registration Service configured to register Distributed Applications for use with the blockchain identity translator.

7. The blockchain identity translator of claim 1 further comprising a BIT Wallet Browser configured to allow secure access to the a Blockchain User Wallet associated with the user.

8. The blockchain identity translator of claim 1 further comprising an application programming interface.

9. The blockchain identity translator of claim 1, wherein the response includes any one, or a combination of, a subset of the electronic identity information of the user, the verified electronic identity information of the user, or the blockchain account information of the user.

10. A computer implemented method for validating the identity of a user from an anonymous blockchain account identifier comprising:
    obtaining, from a certificate authority on the network, the electronic identity information of the user;
    storing the electronic identity of the user in a user identity datastore, wherein the certificate authority provides verification of the electronic identity information of the user;
    obtaining, from a blockchain account provider on the network, an anonymous blockchain account information of the user;
    storing the anonymous blockchain account information of the user in a user identity datastore;
    associating an electronic identity information of a user with an anonymous blockchain account information of the user; and
    responding to a request for identity validation from a device on a network by providing a response based on the anonymous blockchain account information of the user and the associated electronic identity information of the user.

11. The method of claim 10 further comprising:
    obtaining, from a biometric identity authority on the network, a biometric information of the user,
    associating the biometric information of the user with the electronic identity information of the user; and
    storing the associated biometric information of the user in a user identity datastore.

12. The method of claim 10 further comprising:
    registering a Distributed Application, wherein registering includes storing a Distributed Application's authentication credentials and default User identification and authentication methods associated with the Distributed Application.

13. The method of claim 10 further comprising:
    providing a BIT wallet browser service.

14. The method of claim 10 wherein the step of responding further includes:
    including, in the response, any one or a combination of a subset of the electronic identity information of the user, the verified electronic identity information of the user, or the anonymous blockchain account information of the user.

15. A system for validating the identity of a user from an anonymous blockchain account identifier of the user comprising:
    a blockchain identity translator for providing the identity of the user based on the anonymous blockchain account identifier of the user;
    a network;

a certificate authority for providing a verified user identity of the user;
a blockchain account provider configured to provide anonymous blockchain account information of the user; and
a device configured to request the identity of a user from the anonymous blockchain account identifier.

16. The system of claim 15, further comprising:
a biometric identity service provider for providing a biometric identity information of the user.

17. The system of claim 15, further comprising:
a Distributed Application for use with the blockchain identity translator.

\* \* \* \* \*